(12) United States Patent
Kitchin et al.

(10) Patent No.: US 9,043,628 B2
(45) Date of Patent: May 26, 2015

(54) POWER MANAGEMENT OF MULTIPLE COMPUTE UNITS SHARING A CACHE

(75) Inventors: Paul Kitchin, Austin, TX (US); William L. Walker, Fort Collins, CO (US); Steven J. Kommrusch, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 272 days.

(21) Appl. No.: 13/594,410

(22) Filed: Aug. 24, 2012

(65) Prior Publication Data

US 2014/0059371 A1    Feb. 27, 2014

(51) Int. Cl.
*G06F 1/00* (2006.01)
*G06F 1/32* (2006.01)
*G06F 12/08* (2006.01)

(52) U.S. Cl.
CPC ............ *G06F 12/084* (2013.01); *G06F 1/3275* (2013.01); *Y02B 60/1225* (2013.01); *G06F 12/0804* (2013.01); *G06F 12/0811* (2013.01); *G06F 2212/1024* (2013.01); *G06F 2212/1028* (2013.01); *G06F 1/3206* (2013.01)

(58) Field of Classification Search
CPC ..................................................... G06F 1/3203
USPC .......................................................... 713/323
See application file for complete search history.

(56) References Cited

U.S. PATENT DOCUMENTS

| 7,752,474 | B2* | 7/2010 | Keller et al. ................... 713/324 |
| 8,112,652 | B2* | 2/2012 | Sajayan et al. ................ 713/324 |
| 2008/0077813 | A1 | 3/2008 | Keller et al. | |
| 2013/0246825 | A1* | 9/2013 | Shannon ....................... 713/324 |

FOREIGN PATENT DOCUMENTS

| EP | 1607838 A2 | 12/2005 |
| EP | 0607838 A3 | 5/2009 |

OTHER PUBLICATIONS

PCT International Search Report and Written Opinion dated Dec. 12, 2013; 11 pages.
"Effective Flush Cache Command Implementation;" ip.com Journal, ip.com, Inc., West Henrietta, NY, US; Sep. 4, 2006.
"Hybernation (Computing);" Wikipedia.org; Jul. 23, 2012; XP002716587.
Rupley, J.; "Jaguar" AMD's Next Generation Low Power x86 Core; Hotchips 2012; 1-20pgs.

* cited by examiner

*Primary Examiner* — Suresh Suryawanshi (57) ABSTRACT

We report methods, integrated circuit devices, and fabrication processes relating to power management transitions of multiple compute units sharing a cache. One method includes indicating that a first compute unit of a plurality of compute units of an integrated circuit device is attempting to enter a low power state, determining if the first compute unit is the only compute unit of the plurality in a normal power state, and in response to determining the first compute unit is the only compute unit in the normal power state: saving a state of a shared cache unit of the integrated circuit device, flushing at least a portion of a cache of the shared cache unit, repeating the flushing until either a second compute unit exits the low power state or the cache is completely flushed, and permitting the first compute unit to enter the low power state.

29 Claims, 6 Drawing Sheets

POWER MANAGEMENT OF MULTIPLE COMPUTE UNITS SHARING A CACHE

BACKGROUND

1. Technical Field

Generally, the disclosed embodiments relate to integrated circuits, and, more particularly, to power management of multiple compute units sharing memory, such as cache memory.

2. Description of the Related Art

A computer system comprising two or more compute units (e.g., cores of a central processing unit (CPU)) can place those compute units into a lower power state when they are not needed to perform user- or system-requested operations. Placing unneeded compute units into a lower power state may reduce power consumption and heat generation by the computer system, thereby reducing operating expenses of the computer system and extending the service life of the computer system or components thereof. It is common for a computer system to contain a central power management unit (PMU) to orchestrate the low power transitions for each of the compute units within the system. Typically, the PMU can make requests directly to each compute unit to independently power down and power up.

At times, the compute units may share a common memory, such as a cache memory. When a compute unit is directed to power down, one issue to be addressed is the problem of shutting down any associated cache memory that may be shared with another compute unit. Commonly, when a compute unit is directed to power down, the compute unit will save off its architectural state to some memory retention area, flush its caches of all modified data (i.e., complete any writing of modified data from dirty cache locations to main memory and evict the modified data from the cache), and then signal its low power readiness to the PMU. At this point, the PMU will turn off power to that compute unit. When the PMU requires the compute unit to power up (e.g., exit a lower power state or enter a normal power state) to service a process, the PMU will turn on power to the compute unit, and the compute unit will restore its architectural state from the memory retention area and start servicing the process.

A shared cache unit (SCU) is sometimes used within e.g. a CPU system so that all the included compute units can share cache resources. If an existing CPU system design were to add a SCU to its architecture, it can be beneficial for the PMU to directly interact with the SCU via one interface and for that SCU to interact with all the CPU cores directly. However, with such a topology, a legacy PMU might not "understand" the extra level of hierarchy containing the SCU, thereby possibly leading to incomplete or ineffectual power management. Reengineering a PMU/SCU/multiple cores system to understand a hierarchy containing a SCU would be a relatively complicated task which the person of ordinary skill in the art would wish to avoid. Further, engineering other elements of the computer system to aid the PMU in power management of an SCU/multiple cores system runs the risk of requiring a large number of interactions of possibly long latency, which could undesirably slow down power management transitions.

SUMMARY OF EMBODIMENTS

The apparatuses, systems, and methods in accordance with the embodiments disclosed herein may facilitate power management of multiple compute units sharing an SCU by a communication process between a compute unit and a shared cache unit. Mechanisms controlling and implementing such a process may be formed within a microcircuit by any means, such as by growing or deposition.

Some embodiments provide an integrated circuit device that includes a plurality of compute units, a shared cache unit for caching data usable by two or more of the plurality of compute units, a power management unit for requesting each of the plurality of compute units to enter or exit a particular state (e.g., a low power state, a normal power state, etc.), and a memory for storing at least a state of the shared cache unit. In these embodiments, the integrated circuit device is configured to: indicate that a first compute unit of a plurality of compute units of an integrated circuit device is attempting to enter the low power state, determine if the first compute unit is the only compute unit of the plurality in the normal power state, permit the first compute unit to enter the low power state, in response to determining the first compute unit is not the only compute unit in the normal power state, and in response to determining the first compute unit is the only compute unit in the normal power state: save a state, such as a configuration register state, of a shared cache unit of the integrated circuit device, flush at least a portion of a cache of the shared cache unit, repeat the flushing until either a second compute unit exits the low power state or the cache is completely flushed, and permit the first compute unit to enter the low power state.

Some embodiments provide a method that includes indicating that a first compute unit of a plurality of compute units of an integrated circuit device is attempting to enter a low power state, determining if the first compute unit is the only compute unit of the plurality in a normal power state, permitting the first compute unit to enter the low power state, in response to determining the first compute unit is not the only compute unit in the normal power state, and in response to determining the first compute unit is the only compute unit in the normal power state: saving a state of a shared cache unit of the integrated circuit device, flushing at least a portion of a cache of the shared cache unit, repeating the flushing until either a second compute unit exits the low power state or the cache is completely flushed, and permitting the first compute unit to enter the low power state.

Some embodiments provide a method that includes indicating that a first compute unit of a plurality of compute units of an integrated circuit device is attempting to exit a low power state, determining if all other compute units of the plurality are in the low power state, permitting the first compute unit to exit the low power state, in response to determining at least one other compute unit is in a normal power state, and in response to determining all other compute units are in the low power state: restoring a state of a shared cache unit of the integrated circuit device, and permitting the first compute unit to exit the low power state.

The embodiments described herein may be used in any type of integrated circuit that uses multiple compute units, a shared cache unit, and a power management unit. One example is a general purpose microprocessor.

BRIEF DESCRIPTION OF THE FIGURES

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

Embodiments provide for facilitated power management of multiple compute units sharing an SCU. Because communications between a compute unit and an associated SCU typically have long latency, various embodiments of facilitated power management allow a reduced set of communications between each compute unit and the SCU. Thereby, power state transitions may be performed at an acceptably high speed. Various embodiments also substantially or completely hide SCU hierarchy from the PMU, thereby reducing the design changes for a computer system incorporating an SCU shared by multiple cores.

Figure 1:
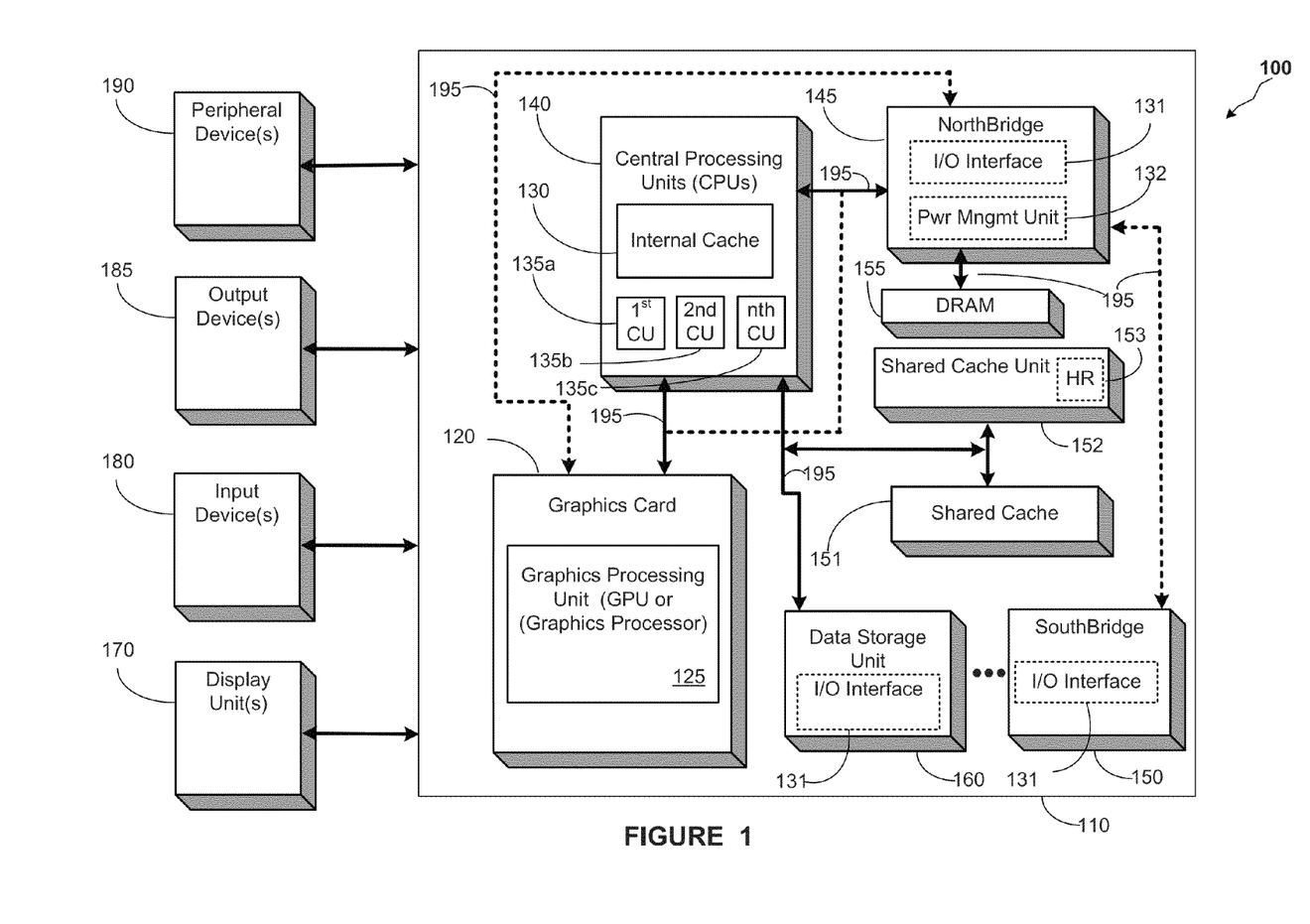
FIG. 1 is a schematic diagram of an exemplary microcircuit design in accordance with some embodiments.

Turning now to FIG. 1, a block diagram representation of a computer system comprising a processor, in accordance with some embodiments, is illustrated. Modern computer systems may exist in a variety of forms, such as telephones, tablet computers, desktop computers, laptop computers, servers, smart televisions, or other consumer electronic devices. The processor unit 110 may comprise one or more central processing units (CPUs) 140, each of which may comprise various compute units (CUs) 135, e.g. first CU 135a, second CU 135b, through $N^{th}$ CU 135c). Each of the CPUs 140 may also comprise an internal cache 130 that provides memory resources for the CUs 135. The processor unit 110 may also comprise a shared cache unit (SCU) 152, which provides a shared cache 151 of memory resources shared among the various CPUs 140, compute units 135 of one or more CPUs 140, and/or graphics processing units (GPUs) 125 of a graphics card 120.

The SCU 152 may comprise a shared cache unit handshake register (HR) 153, which may facilitate communications between the SCU 152 and the computer units 135, CPUs 145, and/or the GPUs 125. Utilizing the shared cache unit HR 153, the compute units 135, CPUs 140, and/or GPUs 125 may write data into the SCU 152, and read data from the SCU 152, when performing various power management operations, as exemplified in more detail below. In some embodiments, each of the compute units 135, CPUs 140, and/or GPUs 125 may write the following values to the shared cache unit handshake register 153: request entry of low power state, request entry of low power state and flush of SCU cache, and request exit of low power state. The SCU 152 may write to, and the compute units 135, CPUs 140, and/or GPUs 125 read from, the shared cache unit handshake register 153 the following responses: entry of low power state permitted, entry of low power state forbidden, exit of low power state permitted, exit of low power state forbidden.

The computer system 100 may also comprise a northbridge 145. Among its various components, the northbridge 145 may comprise a power management unit (PMU) 132 that may regulate the amount of power consumed by the compute units 135, CPUs 140, GPUs 125, and/or the SCU 152. Particularly, in response to changes in demand for the compute units 135, CPUs 140, and/or GPUs 125, the PMU 132 may request each of the plurality of compute units 135, CPUs 140, and/or GPUs 125 to enter a low power state, exit the low power state, enter a normal power state, or exit the normal power state.

In some embodiments, the PMU 132 directly interacts solely with the SCU 152. Power management directives intended for the compute units 135, CPUs 140, and/or GPUs 125 are then relayed by the SCU 152 to the target unit(s) 135, 140, and/or 125. In some embodiments, the PMU 132 may interact with other portion(s) of the computer system.

The computer system 100 may also comprise a DRAM 155. The DRAM 155 may be configured to store one or more states of one or more components of the computer system 100. Particularly, the DRAM 155 may be configured to store one or more states of the SCU 152, one or more states of the compute units 135, one or more states of one or more CPUs 140, and/or one or more states of one or more GPUs 125. For example, the DRAM 155 may be configured to store a configuration register state of the SCU 152. In another example, the DRAM 155 may be configured to store an architectural state of a compute unit 135a, 135b, or 135c.

The computer system 100 may as a routine matter comprise other known units and/or components, e.g., one or more I/O interfaces 131, a southbridge 150, a data storage unit 160, display unit(s) 170, input device(s) 180, output device(s) 185, and/or peripheral devices 190, among others.

The computer system 100 may also comprise one or more data channels 195 for communication between one or more of the components described above.

Figure 2:
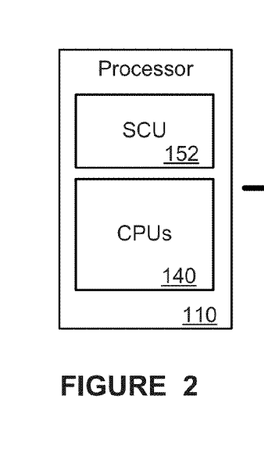
FIG. 2 is a schematic diagram of a central processing unit depicted in FIG. 1, in accordance with some embodiments.
Figure 3A:
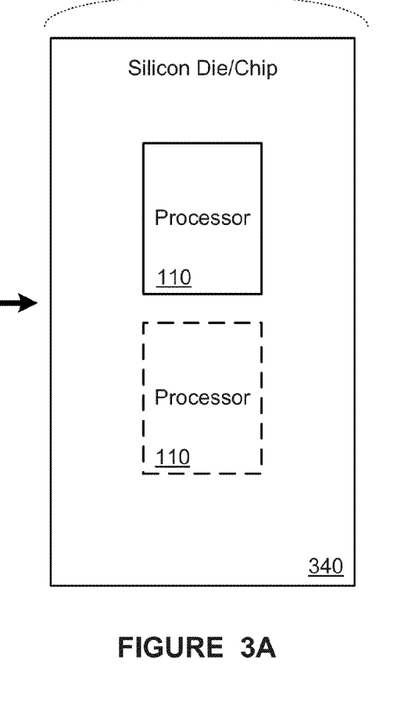
FIG. 3A provides a representation of a silicon die/chip that includes one or more circuits as shown in FIG. 2, in accordance with some embodiments.

Turning now to FIG. 2 and FIG. 3A, in some embodiments, the processor unit 110 may reside on a silicon die/chip 340. The silicon die/chip 340 may be housed on a motherboard or other structure of the computer system 100. In some embodiments, there may be more than one processor unit 110 on each silicon die/chip 340. Some embodiments of the processor unit 110 may be used in a wide variety of electronic devices.

Figure 3B:
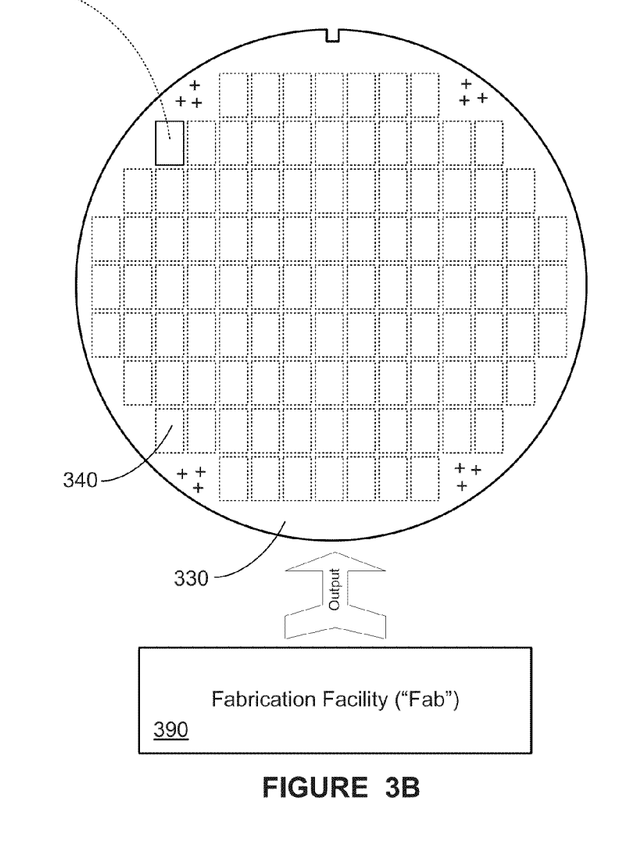
FIG. 3B provides a representation of a silicon wafer which includes one or more dies/chips that may be produced in a fabrication facility, in accordance with some embodiments.

Turning now to FIG. 3B, in accordance with some embodiments, and as described above, the processor unit 110 may be included on the silicon chip/die 340. The silicon chip/die 340 may contain one or more different configurations of the processor unit 110. The silicon chip/die 340 may be produced on a silicon wafer 330 in a fabrication facility (or "fab") 390. That is, the silicon wafer 330 and the silicon die/chip 340 may be referred to as the output, or product of, the fab 390. The silicon chip/die 340 may be used in electronic devices.

The circuits described herein may be formed on a semiconductor material by any known means in the art. Forming can be done, for example, by growing or deposition, or by any other means known in the art. Different kinds of hardware descriptive languages (HDL) may be used in the process of designing and manufacturing the microcircuit devices. Examples include VHDL and Verilog/Verilog-XL. In some embodiments, the HDL code (e.g., register transfer level (RTL) code/data) may be used to generate GDS data, GDSII data and the like. GDSII data, for example, is a descriptive file format and may be used in some embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units, RAMs, compact discs, DVDs, solid state storage and the like) and, in some embodiments, may be used to configure a manufacturing facility (e.g., through the use of mask works) to create devices capable of embodying various aspects of some embodiments. As understood by one or ordinary skill in the art, this data may be programmed into a computer, processor, or controller, which may then control, in whole or part, the operation of a semiconductor manufacturing facility (or fab) to create semiconductor products and devices. In other words, some embodiments relate to a non-transitory computer-readable medium storing instructions executable by at least one processor to fabricate an integrated circuit. These tools may be used to construct the embodiments described herein.

Figure 4:
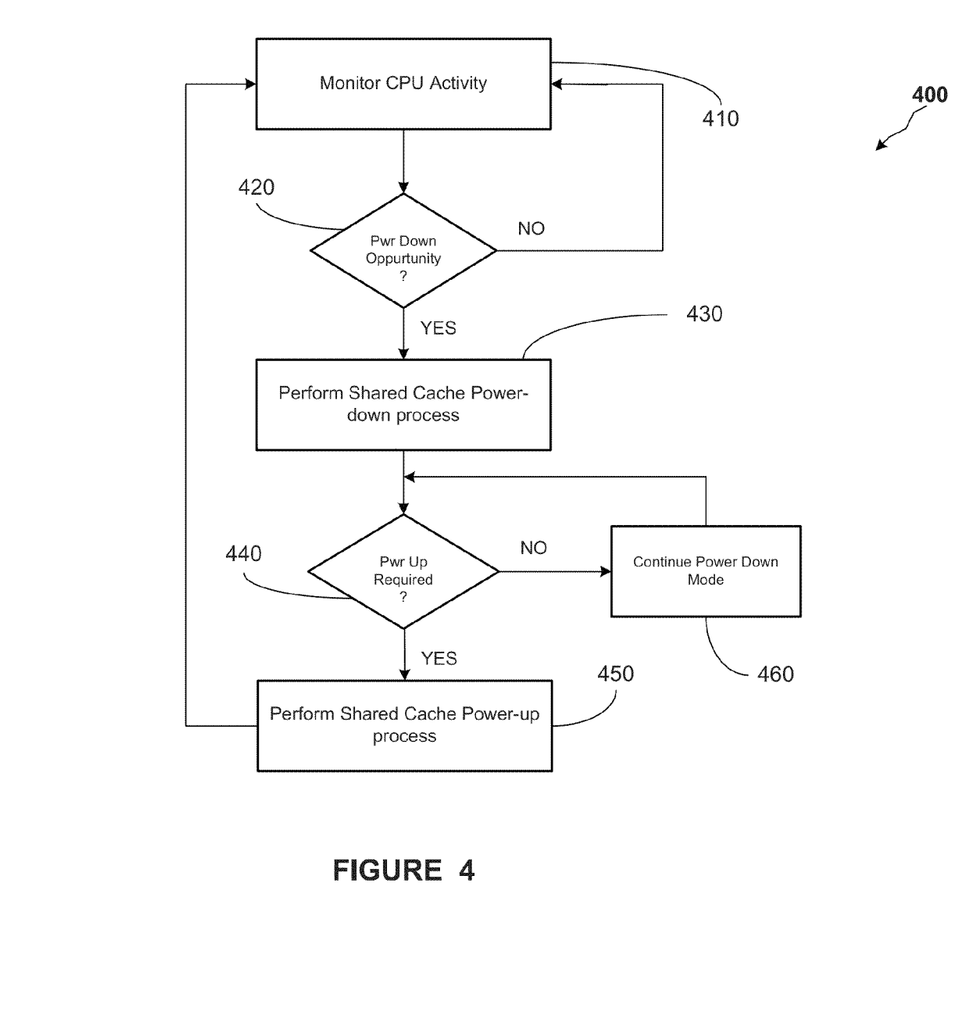
FIG. 4 is a flowchart of a method relating to powering up or down a shared cache unit, in accordance with some embodiments.

FIG. 4 presents a flowchart depicting a method 400 according to some embodiments. As illustrated in FIG. 4, the method 400 may comprise: monitoring (at 410) activity of one or more CPUs (or compute unit(s), GPU(s), etc. For convenience, the term "CPU" will be used in further description of this figure). For example, monitoring may comprise monitoring activity of at least two components each selected from central processing units (CPUs), graphics processing units (GPUs), or compute units of an integrated circuit device. Upon a determination (at 420) that activity of the one or more CPUs is such that a shared cache may be powered down (e.g., sufficiently low activity of the component(s) is occurring), a shared cache power-down process may be performed (at 430). A more detailed description of some embodiments of the shared cache power-down process is provided below. If the determination (at 420) is that the shared cache may not be powered down, flow may be returned to monitoring (at 410). When a determination is made (at 440) that the shared cache is required to be powered up (e.g., the shared cache is needed by at least one of the component(s)), a shared cache power-up process may be performed (at 450), with flow returning to monitoring (at 410). If the determination (at 440) is that the shared cache is not required to be powered up, then the powered-down mode may be continued (at 460), with flow returning to determining (at 440).

Figure 5:
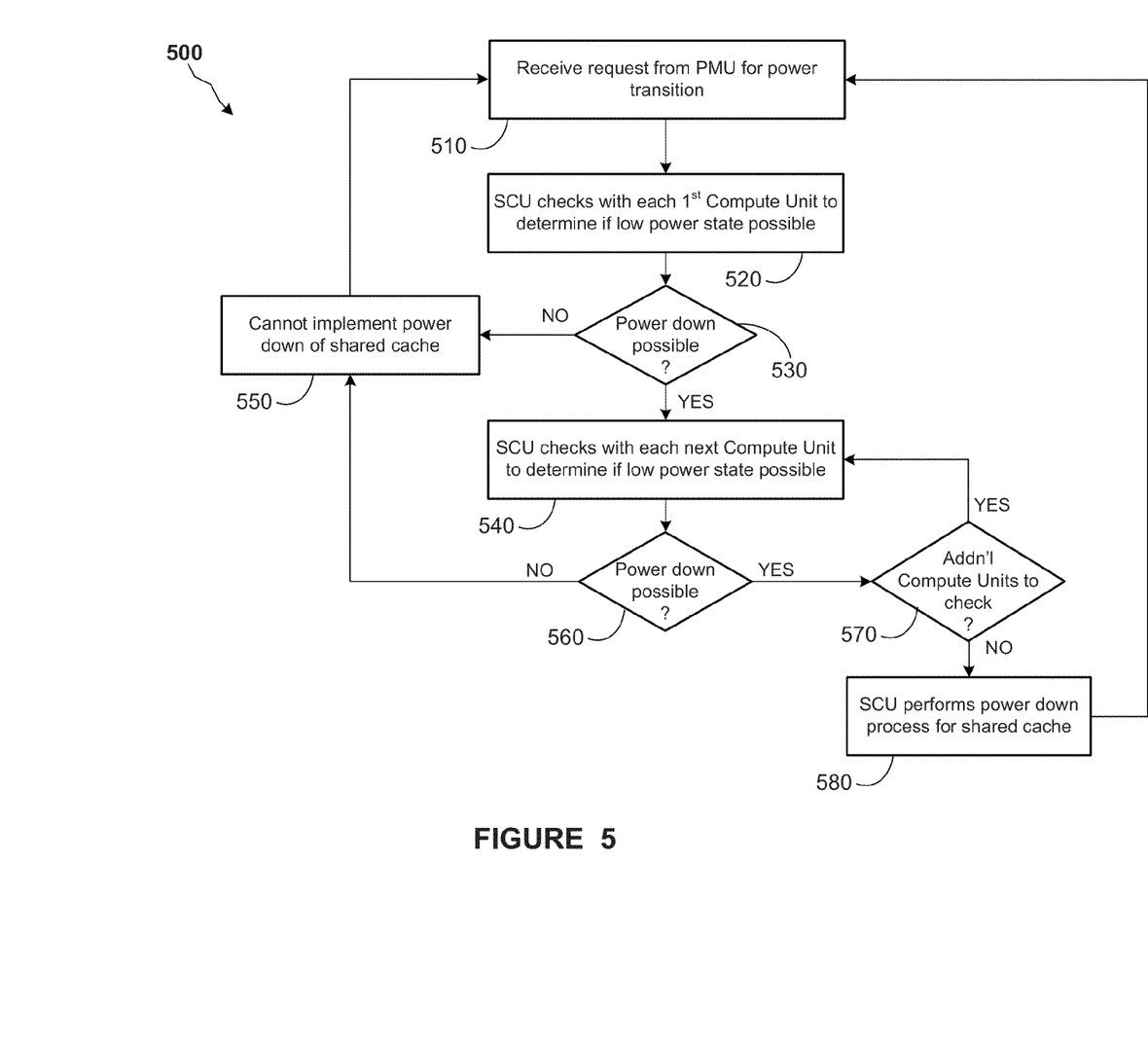
FIG. 5 is a flowchart of a method relating to powering up a shared cache unit, in accordance with some embodiments.

FIG. 5 presents a flowchart depicting a method 500 according to some embodiments. As illustrated in FIG. 5, the method 500 may comprise: receiving (at 510) a request from a power management unit (PMU) for a power transition (e.g., from normal power to low power) (which may be termed "receiving a power transition request"). Upon receiving the request, the computer system (at 520) may check with each first compute unit (or CPU, GPU, etc.) of a plurality of compute units of an integrated circuit device to determine if a low power state is possible (e.g., whether powering down a shared cache is possible). (For convenience, the term "compute unit" will be used in further description of this figure). If a power down is determined (at 530) to be possible, then checking (at 540) with each next compute unit may be performed to determine if a low power state is possible. If the power down is determined (at 560) to be possible, then a determination is made whether there are any additional compute units left to check to see if low power state is possible (at 570). If there is a determination (at 570) that no additional compute units need to be checked regarding the possibility of a low power state (e.g., whether powering down a shared cache is possible), then a shared cache may be powered down (at 580). If a determination is made that additional compute units need to be checked, then flow returns to checking (at 540). If either of the determinations (at 530 or 560) find that power down is not possible, then an indication that the shared cache power-down cannot be implemented can be made (at 550), with flow returning to receipt (at 510) of power transition requests from the PMU.

Figure 6:
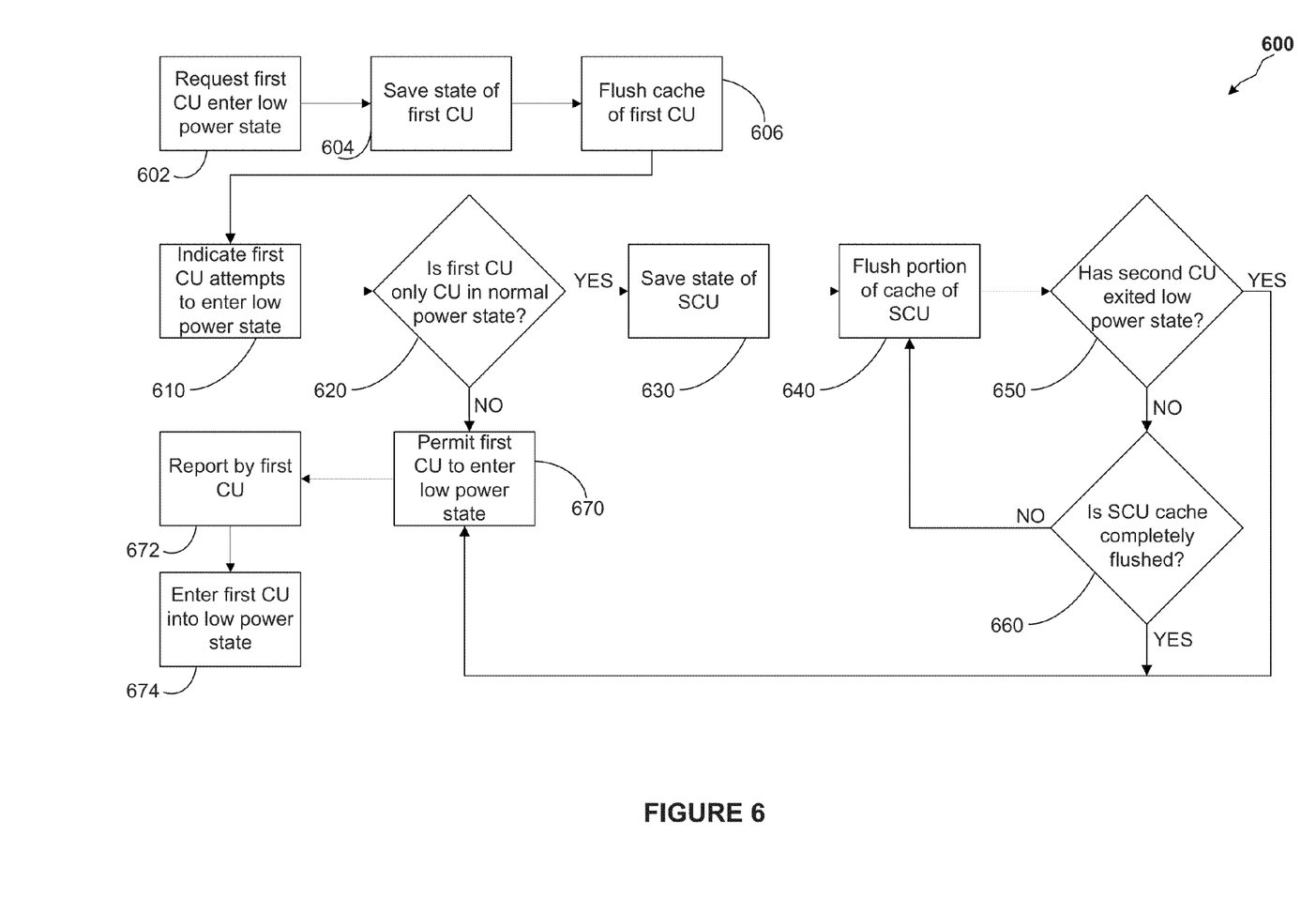
FIG. 6 is a flowchart of a method relating to entry of a compute unit into a low power state, in accordance with some embodiments.

FIG. 6 presents a flowchart depicting a method 600 according to some embodiments. As illustrated in FIG. 6, the method 600 may comprise a request to place the first compute unit (CU) of a plurality of compute units of an integrated circuit device, into a low power state (at 602). In some embodiments, this request may be made by the PMU 132. Upon such a request, information relating to the state of the first CU is saved (at 604). For example, the state of the first CU saved at 604 may be an architectural state. The cache associated with the first CU may be flushed (at 606). An indication (at 610) may be received by the SCU 152 that the first CU is attempting to enter the low power state. A determination (at 620) may be made whether the first compute unit is the only compute unit of the plurality in a normal power state. Upon a determination that the first CU is the only CU in a normal power state, the state (e.g., a configuration register state) of the shared cache unit 152 is saved (at 630) to memory, e.g. to DRAM 155. At least a portion of the cache associated with SCU 152 is flushed (at 640). In some embodiments, this flushing process may be repeated until either a second compute unit exits the low power state (as determined at 650) or the cache is completely flushed (as determined at 660). Upon a determination that the second CU has exited a low power state (at 650), or a determination that the SCU cache is completely flushed (at 660), the first compute unit may be permitted to enter the low power state (at 670). That is, the first compute unit may be permitted to enter the low power state in response to determining at 620 the first compute unit is not the only compute unit in the normal power state; or, in response to determining at 650 and 660 the first compute unit is the only compute unit in the normal power state and the SCU cache is completely flushed.

The size of the portion of the cache of the SCU flushed at 640 may be chosen in view of a tradeoff between reducing the latency of the process (which argues for reducing the sizes of the portions) and reducing the overhead of write/flush/read cycles (which argues for increasing the sizes of the portions). Also, the first compute unit must be able to respond to interrupts, e.g., those arising when a second compute unit exits the low power state as determined at 650. In some embodiments, this may be another reason for reducing the size of the portions.

Also as depicted in FIG. 6, upon permitting the first CU to enter into a low power state (at 670), the first compute unit (at 672) may report (e.g., to the PMU 132) that it is permitted to enter the low power state subsequent the permitting (at 670); and the first CU (at 674) may enter into the low power state.

In some embodiments, the SCU 152 may enter into a low power state if all compute units are in a low power state. In some embodiments, indicating (at 610) comprises writing to a shared cache unit handshake register 153.

In some embodiments, various steps shown in FIG. 6 (e.g., 602, 604, 610, etc.) may be omitted from FIG. 6 and remain within the spirit and scope of the embodiments.

Figure 7:
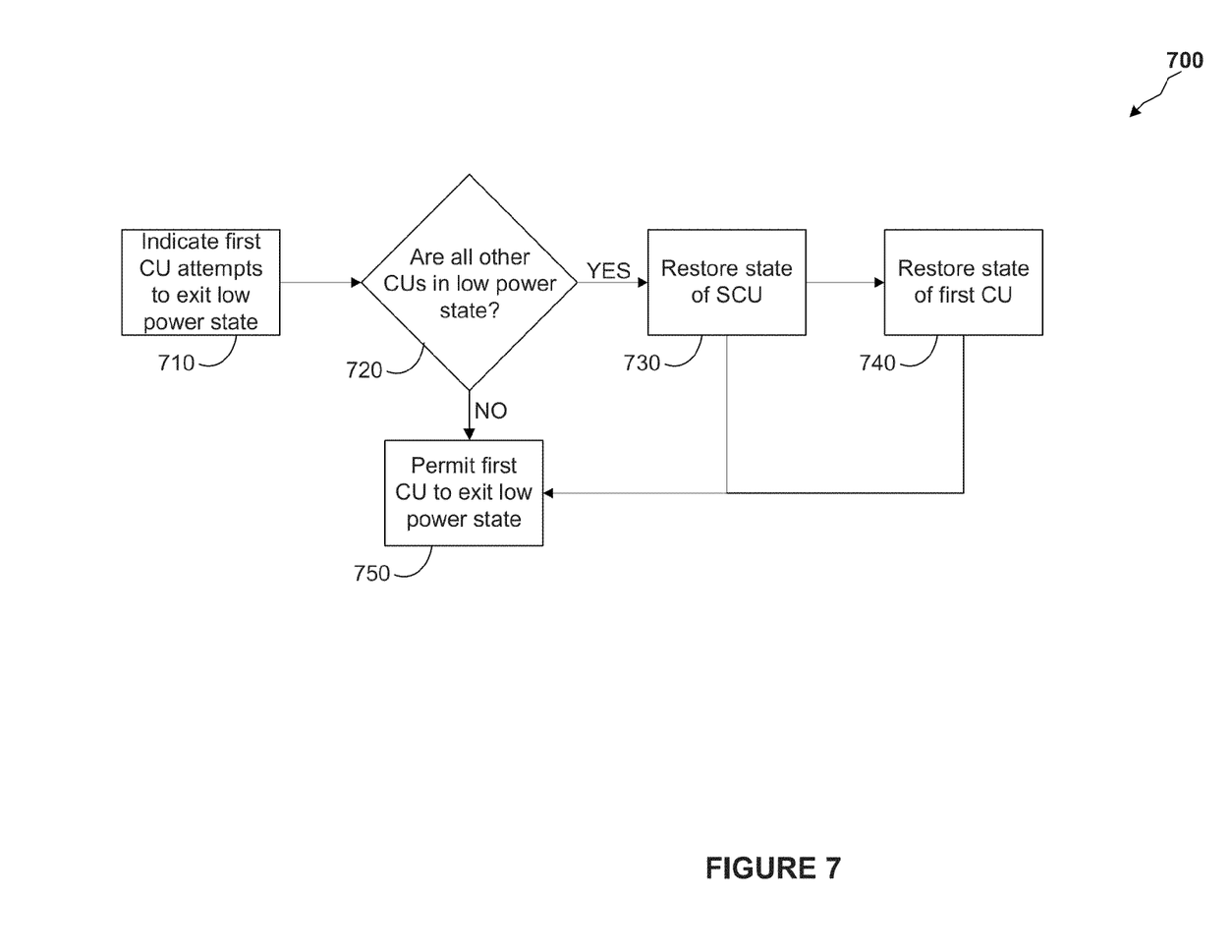
FIG. 7 is a flowchart of a method relating to entry of a compute unit into a normal power state, in accordance with some embodiments.

FIG. 7 presents a flowchart depicting a method 700 according to some embodiments. An indication may be made (at 710) that a first compute unit (CU) of a plurality of compute units of an integrated circuit device is attempting to exit a low power state. The prompt to exit the low power state may be the result of one or may possible actions, such as a message from PMU 132. A determination (at 720) is made whether all other compute units of the plurality are in the low power state. If not all other compute units are in the low power state, the first compute unit is permitted (at 750) to exit the low power state. That is, if at least one other compute unit is in a normal power state, the first compute unit is permitted (at 750) to exit the low power state. This is allowed since if at least one compute unit is in the normal power state, the state of the SCU 152 is intact and/or has been previously restored, and the CU in the low power state can be brought up to the normal power state without needing to restore the state of the SCU 152.

In the event a determination (at 720) is made that all other compute units are in the low power state (i.e., not even a single CU is in a normal power state), at 730, a state (e.g., a configuration register state) of a shared cache unit (SCU) of the integrated circuit device is restored. This is performed because when all compute units are in a low power mode, the SCU 152 may also have been in a power/sleep mode. In some embodiments (such as embodiments wherein there is no need to restore a state, such as an architectural state, of the first compare unit), upon restoration of the state (e.g., the configuration register state) of the SCU 152 from memory (e.g., from DRAM 155), the first CU may be permitted to exit the low power state.

In some embodiments, upon the determination (at 720) that all other compute units are in the low power state, a state (e.g., an architectural state) of the first compute unit may be restored (at 740) from memory (e.g., from DRAM 155), after which the first compute unit may be permitted to exit the low power state.

In some embodiments, indicating that the first CU is attempting to exit a low power state (at 710) comprises writing to a shared cache unit handshake register 153.

The methods illustrated in FIGS. 4-7 may be governed by instructions that are stored in a non-transitory computer readable storage medium and that are executed by at least one processor of the computer system 100. Each of the operations shown in FIGS. 4-7 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method, comprising:
    indicating that a first compute unit of a plurality of compute units of an integrated circuit device is attempting to enter a low power state;
    determining if the first compute unit is the only compute unit of the plurality of compute units in a normal power state; and
    when the first compute unit is the only compute unit in the normal power state:
        saving a state of a shared cache unit of the integrated circuit device;
        flushing a portion of a cache of the shared cache unit;
        repeating the flushing until either a second compute unit exits the low power state or the cache is completely flushed; and
        permitting the first compute unit to enter the low power state.

2. The method of claim 1, further comprising, when the first compute unit is not the only compute unit in the normal power state, permitting the first compute unit to enter the low power state.

3. The method of claim 1, wherein prior to the indicating, the method further comprises:
    requesting the first compute unit to enter the low power state;
    saving a state of the first compute unit; and
    flushing a cache of the first compute unit.

4. The method of claim 1, further comprising:
    reporting by the first compute unit that the first compute unit is permitted to enter the low power state subsequent the permitting; and
    instructing the first compute unit to enter the low power state.

5. The method of claim 1, wherein the indicating comprises writing to a shared cache unit handshake register.

6. A method, comprising:
    indicating that a first compute unit of a plurality of compute units of an integrated circuit device is attempting to exit a low power state;
    determining if all other compute units of the plurality of compute units are in the low power state; and
    when all other compute units are in the low power state:
        restoring a state of a shared cache unit of the integrated circuit device; and
        permitting the first compute unit to exit the low power state.

7. The method of claim 6, further comprising, when at least one other compute unit is in a normal power state, permitting the first compute unit to exit the low power state.

8. The method of claim 6, further comprising:
    restoring a state of the first compute unit prior to permitting the first compute unit to exit the low power state.

9. The method of claim 6, wherein the indicating comprises writing to a shared cache unit handshake register.

10. An integrated circuit device, comprising:
    a plurality of compute units;
    a shared cache unit configured to cache data usable by two or more of the plurality of compute units;
    a power management unit configured to request that a respective compute unit of the plurality of compute units enter a low power state, exit the low power state, enter a normal power state, or exit the normal power state; and,
    a memory configured to store at least a state of the shared cache unit;
    wherein a first compute unit of the plurality of compute units is configured to indicate that the first compute unit is attempting to enter the low power state, and, when the first compute unit is the only compute unit in the normal power state, to save a state of a shared cache unit to the memory, to flush a portion of a cache of the shared cache unit; and to repeat the flushing until either a second compute unit exits the low power state or the cache is completely flushed;

wherein the shared cache unit is further configured to determine if the first compute unit is the only compute unit of the plurality in the normal power state; and wherein the power management unit is further configured to permit the first compute unit to enter the low power state upon completion of any required flushing by the first compute unit.

11. The integrated circuit device of claim 10, wherein the power management unit is further configured to permit the first compute unit to enter the low power state when the first compute unit is not the only compute unit in the normal power state.

12. The integrated circuit device of claim 10, wherein the power management unit is further configured to, prior to the indicating, request the first compute unit to enter the low power state; and wherein the first compute unit of the plurality of compute units is further configured to save a state of the first compute unit and flush a cache of the first compute unit subsequent the requesting and prior to the indicating.

13. The integrated circuit device of claim 10, wherein the first compute unit is further configured to:

report that the first compute unit is permitted to enter the low power state subsequent the permitting; and wherein the power management unit is further configured to instruct the first compute unit to enter the low power state.

14. The integrated circuit device of claim 10, wherein the shared cache unit further comprises a shared cache unit handshake register, and wherein the first compute unit is configured to indicate by writing to the shared cache unit handshake register.

15. An integrated circuit device, comprising:
a plurality of compute units;
a shared cache unit configured to cache data usable by two or more of the plurality of compute units;
a power management unit configured to request each of the plurality of compute units to enter a low power state, exit the low power state, enter a normal power state, or exit the normal power state; and,
a memory configured to store at least a state of the shared cache unit;
wherein a first compute unit is configured to indicate that the first compute unit is attempting to exit the low power state and, when all other compute units are in the low power state, to restore a state of the shared cache unit;
wherein the shared cache unit is configured to determine if all other compute units of the plurality are in the low power state; and
wherein the power management unit is configured to permit the first compute unit to exit the low power state subsequent to restoring the state of the shared cache unit.

16. The integrated circuit device of claim 15, wherein the power management unit is further configured to permit the first compute unit to exit the low power state, when at least one other compute unit is in the normal power state.

17. The integrated circuit device of claim 15, wherein the first compute unit is further configured to restore a state of the first compute unit from memory prior to permitting the first compute unit to exit the low power state.

18. The integrated circuit device of claim 15, wherein the shared cache unit further comprises a shared cache unit handshake register, and wherein the first compute unit is further configured to indicate by writing to the shared cache unit handshake register.

19. A non-transitory computer-readable storage medium storing instructions executable by at least one processor to fabricate an integrated circuit, the integrated circuit comprising:
a plurality of compute units;
a shared cache unit configured to cache data usable by two or more of the plurality of compute units;
a power management unit configured to request that a respective compute unit of the plurality of compute units enter a low power state, exit the low power state, enter a normal power state, or exit the normal power state; and,
a memory configured to store at least a state of the shared cache unit;
wherein a first compute unit of the plurality of compute units is configured to indicate that the first compute unit is attempting to enter the low power state and, when the first compute unit is the only compute unit in the normal power state, to save a state of a shared cache unit to the memory, to flush a portion of a cache of the shared cache unit; and to repeat the flushing until either a second compute unit exits the low power state or the cache is completely flushed;
wherein the shared cache unit is further configured to determine if the first compute unit is the only compute unit of the plurality in the normal power state; and
wherein the power management unit is further configured to permit the first compute unit to enter the low power state upon completion of any required flushing by the first compute unit.

20. The non-transitory computer readable storage medium of claim 19, wherein the power management unit is further configured to permit the first compute unit to enter the low power state when the first compute unit is not the only compute unit in the normal power state.

21. The non-transitory computer readable storage medium of claim 19,
wherein the power management unit is further configured to, prior to the indicating, request the first compute unit to enter the low power state; and
wherein the first compute unit is further configured to save a state of the first compute unit and flush a cache of the first compute unit subsequent the requesting and prior to the indicating.

22. The non-transitory computer readable storage medium of claim 19,
wherein the first compute unit is further configured to report that the first compute unit is permitted to enter the low power state subsequent the permitting; and
wherein the power management unit is further configured to instruct the first compute unit to enter the low power state.

23. The non-transitory computer readable storage medium of claim 19, wherein the shared cache unit further comprises a shared cache unit handshake register, and wherein the first compute unit is configured to indicate by writing to the shared cache unit handshake register.

24. A non-transitory computer-readable storage medium storing instructions executable by at least one processor to fabricate an integrated circuit, the integrated circuit comprising:
a plurality of compute units;
a shared cache unit configured to cache data usable by two or more of the plurality of compute units;

a power management unit configured to request each of the plurality of compute units to enter a low power state, exit the low power state, enter a normal power state, or exit the normal power state; and, a memory configured to store at least a state of the shared cache unit;

wherein a first compute unit of the plurality of compute units is configured to indicate that the first compute unit is attempting to exit the low power state and, when all other compute units are in the low power state, to restore a state of the shared cache unit;

wherein the shared cache unit is further configured to determine if all other compute units of the plurality are in the low power state; and wherein the power management unit is further configured to permit the first compute unit to exit the low power state subsequent to restoring the state of the shared cache unit.

25. The non-transitory computer readable storage medium of claim 24, wherein the power management unit is further configured to permit the first compute unit to exit the low power state, when at least one other compute unit is in the normal power state.

26. The non-transitory computer readable storage medium of claim 24, wherein the first compute unit is further configured to restore a state of the first compute unit from memory prior to permitting the first compute unit to exit the low power state.

27. The non-transitory computer readable storage medium of claim 24, wherein the shared cache unit further comprises a shared cache unit handshake register, and wherein the first compute unit is further configured to indicate by writing to the shared cache unit handshake register.

28. A method, comprising:

monitoring activity of at least two components each selected from central processing units (CPUs), graphics processing units (GPUs), or compute units of an integrated circuit device;

powering down a shared cache, in response to a finding of sufficiently low activity of the at least two components; and powering up the shared cache, in response to a finding that the shared cache is needed by at least one of the at least two components.

29. A method, comprising, receiving a power transition request;

checking each of a plurality of central processing units (CPUs), graphics processing units (GPUs), or compute units of an integrated circuit device as to whether powering down a shared cache is possible, in response to the receiving; and powering down the shared cache, in response to a determination that powering down the shared cache is possible.

* * * * *